(12) United States Patent
Zuffa

(10) Patent No.: US 7,134,866 B2
(45) Date of Patent: Nov. 14, 2006

(54) CAROUSEL APPARATUS FOR MANUFACTURING ARTICLES MADE OF PLASTICS BY COMPRESSION MOLDING

(75) Inventor: Zeno Zuffa, Borgo Tossignano (IT)

(73) Assignee: Sacmi Imola S.C., Imola (IT)

( * ) Notice: Subject to any disclaimer, the term of this patent is extended or adjusted under 35 U.S.C. 154(b) by 0 days.

(21) Appl. No.: 10/474,858

(22) PCT Filed: Mar. 22, 2002

(86) PCT No.: PCT/EP02/03277

§ 371 (c)(1),
(2), (4) Date: Oct. 15, 2003

(87) PCT Pub. No.: WO02/083388

PCT Pub. Date: Oct. 24, 2002

(65) Prior Publication Data

US 2004/0115300 A1    Jun. 17, 2004

(30) Foreign Application Priority Data

Apr. 18, 2001    (IT) .......................... BO2001A0288

(51) Int. Cl.
*B29C 43/08*    (2006.01)
*B29C 43/42*    (2006.01)

(52) U.S. Cl. ...................... 425/349; 425/422; 425/423; 425/438; 425/809

(58) Field of Classification Search ................. 425/345, 425/349, 422, 423, 438, 454, 457, DIG. 58, 425/809
See application file for complete search history.

(56) References Cited

U.S. PATENT DOCUMENTS

| 3,482,815 | A | | 12/1969 | Naturale |
| 4,618,121 | A | * | 10/1986 | Conti ........................... 249/59 |
| 5,786,079 | A | * | 7/1998 | Alieri .......................... 425/349 |
| 6,435,857 | B1 | * | 8/2002 | Mitteregger et al. . 425/DIG. 58 |
| 6,736,628 | B1 | * | 5/2004 | Zuffa .......................... 425/437 |

FOREIGN PATENT DOCUMENTS

EP    A-0 730 520    9/1996
WO    A-97 27037    7/1997

OTHER PUBLICATIONS

Patent Abstracts of Japan vol. 015, No. 505 (M-1194), Dec. 20, 1991 & JP 03 222708 A (Hitachi Lighting Ltd.) Oct. 1, 1991 abstract.

* cited by examiner

*Primary Examiner*—Yogendra N. Gupta
*Assistant Examiner*—Thu Khanh T. Nguyen
(74) *Attorney, Agent, or Firm*—Modiano & Associati; Albert Josif; Daniel O'Byrne

(57) ABSTRACT

An apparatus for manufacturing hollow, plastics articles having internal undercuts, comprising at least one compression-molding unit, composed of an upper male mold part comprising a plug and of a lower female mold part aligned, with the male mold part, an actuation for actuating the mold parts between a spaced position, at which a dose of plastics is deposited in the female mold part, and an adjacent, compression molding position, a slideable tube, having an end portion with angularly distributed seats with oscillating elements articulated along radial planes, provided externally with recesses, a stem accommodated coaxially inside the tube, that actuates during the mold closure, the oscillating elements to form, with the tube end portion, the molding plug, and, during the mold opening a position in which to allow the extractor to remove articles from the plug.

21 Claims, 5 Drawing Sheets

CAROUSEL APPARATUS FOR MANUFACTURING ARTICLES MADE OF PLASTICS BY COMPRESSION MOLDING

BACKGORUND OF THE INVENTION

The present invention relates to a carousel apparatus for manufacturing articles made of plastics by compression molding.

Compression molding apparatuses generally comprise a carousel that can rotate about a vertical axis and on which a plurality of angularly spaced molding units are installed. Each unit comprises an upper male element (plug) aligned with a lower female mold part (cavity).

In order to obtain the article, a dose of semifluid plastic material is deposited in the female mold part and pressed by means of a mutual relative movement of the two mold parts.

In the manufacture of caps for closing containers provided with internal undercuts (for example constituted by teeth for engaging a collar of the container to which the cap is to be applied), the molded cap, after opening the mold parts, remains attached to the plug and is removed by means of an ejector which, by utilizing the elasticity of the plastic material, which has not hardened yet, pulls the cap off the plug. This type of removal is applicable to cases in which the internal undercuts do not protrude substantially. In any case, it is necessary to foresee that in a significant percentage of articles, separating the formed caps from the plug by forcing causes damage to the undercuts, especially when the undercuts are particularly large or arranged at right angles with respect to the wall from which they protrude.

SUMMARY OF THE INVENTION

The aim of the present invention is to obviate the above cited drawbacks of known devices, by providing a carousel apparatus for forming hollow articles, particularly caps for closing containers, which have internal undercuts and protrusions, and for extracting them without compromising the integrity of the article removed from the molding plug.

Within this aim, an object of the present invention is to provide an apparatus in which the cap forming means assist in the extraction of the molded caps from the mold.

This aim and this object are both achieved by the present apparatus, whose characteristics are defined in the appended claims.

BRIEF DESCRIPTION OF THE DRAWINGS

Further characteristics and advantages of the present invention will become better apparent from the following detailed description of a preferred but not exclusive embodiment of a carousel apparatus for manufacturing caps provided with internal teeth by compression-molding plastic material, illustrated only by way of non-limitative example in the accompanying drawings, wherein.

DESCRIPTION OF THE PREFERRED EMBODIMENTS

Figure 1:
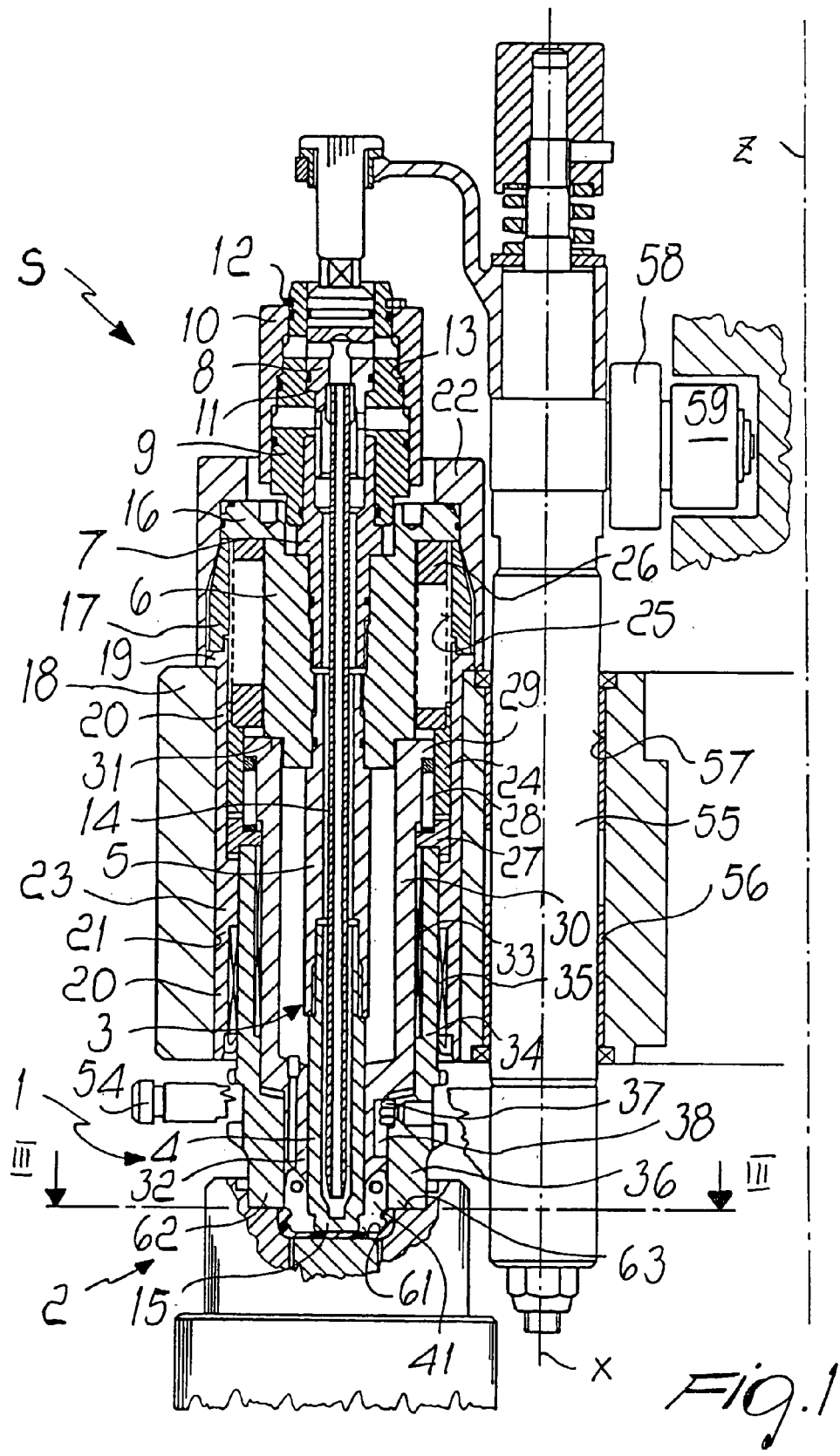
FIG. 1 is a sectional view, taken along a vertical line, of a molding unit of the apparatus.
Figure 2:
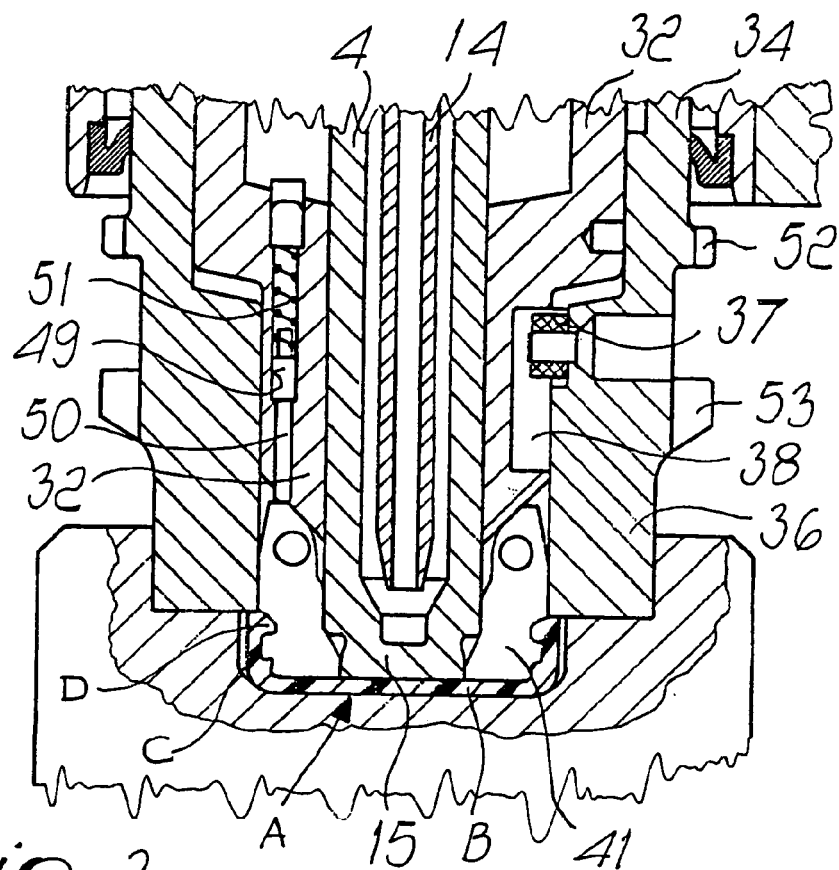
FIG. 2 is an enlarged-scale view of the lower part of FIG. 1 related to the molding plug.
Figure 3:
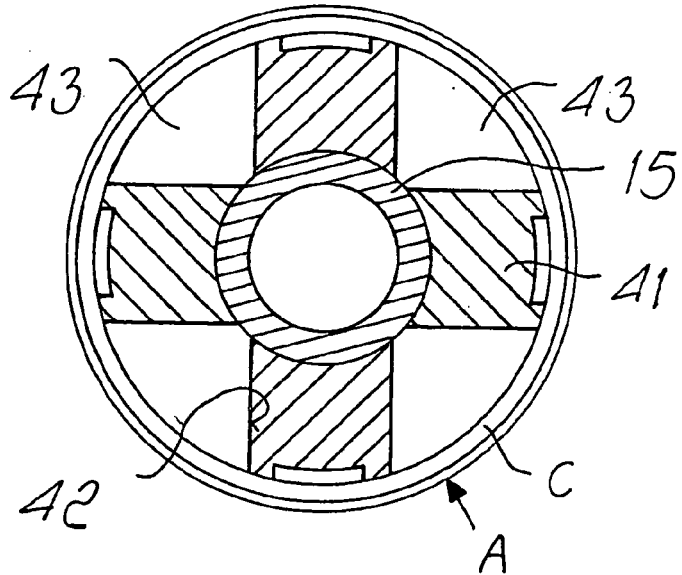
FIG. 3 is a sectional view, taken along the line III—III of FIG. 1.

With reference to FIGS. 1 to 3, the apparatus is constituted by a carousel which can rotate about a vertical axis Z and supports, on its peripheral region, multiple units S for molding caps that consist of closures A made of plastic material.

Hereinafter, it is assumed that the closures A are shaped like a cylindrical cup with a bottom B and a cylindrical wall C provided with internal protrusions. For the sake of greater clarity of presentation and merely by way of example, it is assumed hereinafter that the protrusions consist of four teeth D, constituted by four ribs which are arranged in a cross-like configuration and trace a helical path in order to allow to screw the closure on so as to close a container.

Each unit S is composed of an upper male mold part, generally designated by the reference numeral 1, and by a lower female mold part, generally designated by the reference numeral 2, which are mutually coaxial along an axis X, which is parallel to the axis Z. The female mold part 2 can be actuated against the male mold part 1 by means of a hydraulic jack, not shown.

The male mold part 1 comprises a vertical tubular stem 3, composed of seven tubular elements 4, 5, 6, 7, 8, 9 and 10, in which the elements 4–8 are connected to each other by screw coupling, while the element 9 is retained between the top of the element 7 and a shoulder 11 of the element 8. The element 10 is external to the element 8 and is retained between an elastic retention ring 12, inserted in an annular slot of the outer element 10, and a shoulder 13 of the element 9.

A narrow tube 14 lies inside the tubular stem 3 and forms two mutually coaxial interspaces, which are connected respectively to the delivery and the return of a liquid for cooling the plate 15 that closes the tubular stem 3 in a downward region.

The element 6 is provided with a flange 16, by way of which it rests, by means of a spacer 17, on a drum 18, which constitutes the supporting structure of the molding units, which is turned about the axis Z by means of a motor drive, not shown.

The spacer 17 is centered on the outer lip 19 of a cylindrical jacket 20, which covers a cylindrical seat 21 that passes vertically through the drum 18. The flange 16, the spacer 17 and the lip 19 are locked in a packed configuration on the drum by means of a clamp 22, which is fixed by screws.

The jacket 20 has an inner annular shoulder 23, which is suitable to support a bush 24 that can slide in the part of the jacket that lies above the shoulder 23.

An annular chamber 25 is formed between the tubular element 6 and the spacer 17 and accommodates a cylindrical spring 26. The spring 26 is pre-compressed between the flange 16 and the top of the bush 24, so as to push the bush toward the shoulder 23.

The bush 24 has, at its lower end, an annular lip 27, which protrudes inwardly and acts as a support for a second spring 28, which is less rigid than the spring 25.

The spring 28 abuts, with its end, against the outer annular lip 29 of a tube 30, which is coaxial to the tubular stem 3, actuating said tube upwardly so as to abut against a shoulder 31 formed at the lower end of the element 6.

The tube 30 comprises, in a downward region, a tubular portion 32, which extends below the drum 18 and can slide on the element 4 of the tubular stem 3.

The tube 30, by means of an axial bearing 33, is guided slidingly in a sleeve 34, which in turn is guided slidingly in the tubular jacket 20 by means of an additional axial bearing 35.

The sleeve 34 comprises an upper edge, which is suitable to abut against the lip 27 of the bush 24, and a lower tubular portion 36, which can slide on the tubular portion 32 of the tube 30. Such portion 36 is referenced hereinafter as extractor, owing to its function of removing the molded closure A from the plug.

The tube 30 and the extractor 36 can move axially with respect to each other but are rotationally rigidly coupled by means of a roller 37, which protrudes into the extractor 36 in order to engage an axial slot 38 of the portion-32 of the tube 30.

Figure 5:
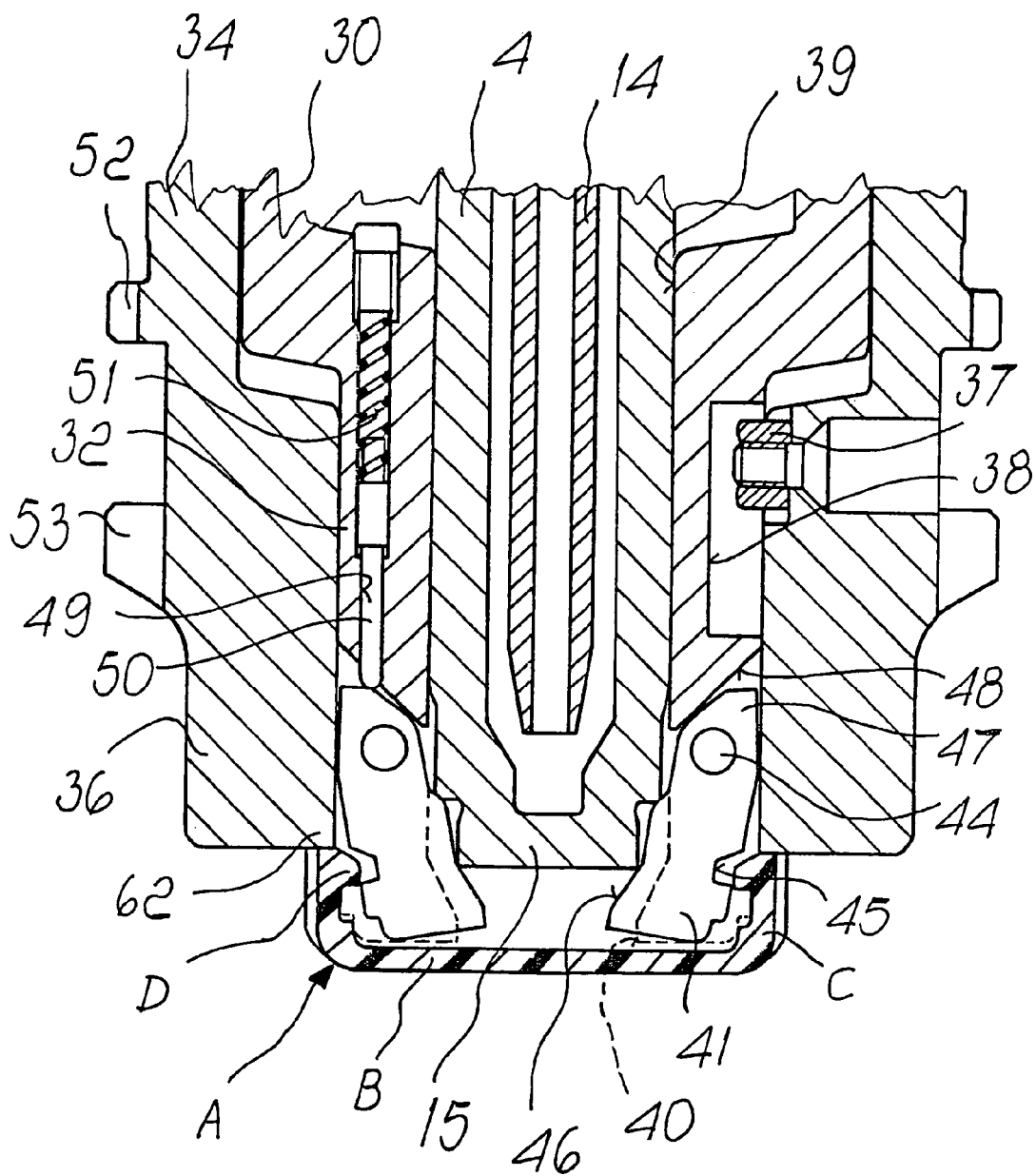
FIG. 5 is an enlarged-scale view of the lower part of FIG. 4; and finally

As shown more clearly by FIGS. 3 and 5, the portion 32 encloses a channel 39 for the sliding of the tubular element 4. The channel 39 tapers downward, forming an opening 40 whose diameter is such as to receive the plate 15 with a sliding coupling.

The portion 32 comprises an end part whose outer shape is complementary to the inner shape of the closure A and constitutes, together with the plate 15, the plug for molding the closure A.

In order to allow the formation of the internal teeth D of the cap during molding and the removal of the cap once molding is complete, the sectors of the end part of the portion 32 that are designed to form the teeth D are constituted by oscillating elements or plate-like pawls 41 which, after the closure has been molded, are moved away from the inner wall in order to release the molded teeth.

For this purpose, in the end part of the portion 32 there are four radial notches 42 (see FIG. 3), which are arranged in a cross-like configuration; each notch is formed by two parallel walls, which delimit the segments or sectors 43 interposed between the pawls 41.

The respective pawls 41 are pivoted in the notches 42, by means of pivots 44, so as to oscillate on planes that are radial with respect to the axis X. The pawls 41 have an outer face which duplicates the outer profile of the end part of the portion 30 and is provided with a recess 45 which, together with the side walls of the notches and when the outer faces of the pawls 41 and of the sectors 43 lie on the same cylindrical plane, forms the receptacle for molding the teeth D.

The pawls 41 have an inner edge provided with ramps 46 which are in functional contact with the edge of the plate 15, so that when the tube 30 reaches, with the opening 40, the level of the plate 15, the pawls 41 are pushed outward into the position for completing the plug, while when the tube 30 moves into the position in which the opening 40 lies below the plate 15, the pawls 41 can oscillate toward the inside of the tube 30. In order to ensure that the pawls 41 stop in the plug completion position, the pawls 41 have an extension 47 that is suitable to abut against the surface 48 that joins the walls that delimit the notch 42.

In the portion 32 of the tube 30, on the planes of the pawls 41, there are axial holes 49, which are parallel to the axis X and lead onto the surface 48 of the notches 42.

The holes 49 slidingly accommodate respective rods 50, which protrude with their lower end into the notches 42 through the surface 48.

The rods 50 are actuated by springs 51, which keep them in contact with the extensions 47. The axis of the rods passes outside the axis of the pivots 44, so that the pawls 41 are pushed inward until the ramps 46 abut against the end of the stem 3.

The extractor 36 is provided externally with two collars 52 and 53, between which an arm 54 is engaged; arm 54 is radially-rigidly coupled to a column 55, which is guided slidingly, by means of bearings 56, in a cylindrical seat 57 of the drum, which is parallel to the axis X.

The column 55 extends above the drum 18 with a part on which rollers 58, 59 are mounted so as to cantilever out. The roller 58 slides in a vertical slot of a bracket, not shown, which is fixed on the drum 18 and is designed to prevent the rotation of the column 55 while allowing its axial sliding. The roller 58 instead engages the channel of a stationary cam 60, which protrudes concentrically to the axis Z and actuates the axial movements of the column 55 during the rotation of the drum.

The operation of the described apparatus is as follows. During the rotation of the carousel, a dose of pasty plastic material is deposited in the cavity 61 of the female mold part 2. During this step, the female mold part 2 is lowered with respect to the male mold part 1.

In this lowered position of the female mold part 2, the plate 15 of the stem 3 closes the opening 40 of the portion 32, so that the pawls 41 complete the shape of the molding plug.

By way of the hydraulic lifting of the female mold part 2, the lower edge 62 of the extractor 36 first abuts against the shoulder 63 of the mold part 2 (see FIG. 1), thus delimiting the molding chamber of the closure A.

As the lifting of the female mold part 2 continues, the plastic material is compressed and is distributed in the molding chamber, filling it and causing, by way of its incompressibility, the stopping of the female mold part in the final position in which the closure A has assumed its final shape.

It should be noted that during this step the tube 30 remains motionless, while the sleeve 34 moves upward, acting on the bush 24 and compressing the springs 28 and 26.

Once the molding of the closure A has been completed and the female mold part 2 has been moved away, the descent of the column 55 is started by way of the actuation imparted by the stationary cam 60 to the roller 59; the column draws the sleeve 34 with it by means of the arm 54.

In this manner, the extractor 36 acts, with its edge 62, on the edge of the closure A, which by being engaged by the teeth D with the pawls 41, draws the tube 30 with it. The descent of the tube 30 is contrasted by the spring 28, which however, being very weak with respect to the traction force applied by the extractor 36, is unable to allow the forced disengagement of the teeth D from the recesses of the pawls 41.

With the descent of the tube 30, the plate 15 frees the opening 40, allowing the pawls 41 to oscillate inward as the plate 15 moves away. The inward oscillation of the pawls 41 is partly due to the shape of the teeth D (which resolves the thrust applied axially to the closure A by the extractor 36 into a component that is directed toward the axis X) and partly due to the thrust applied by the rods 50 on the extensions 47 of the pawls.

Figure 4:
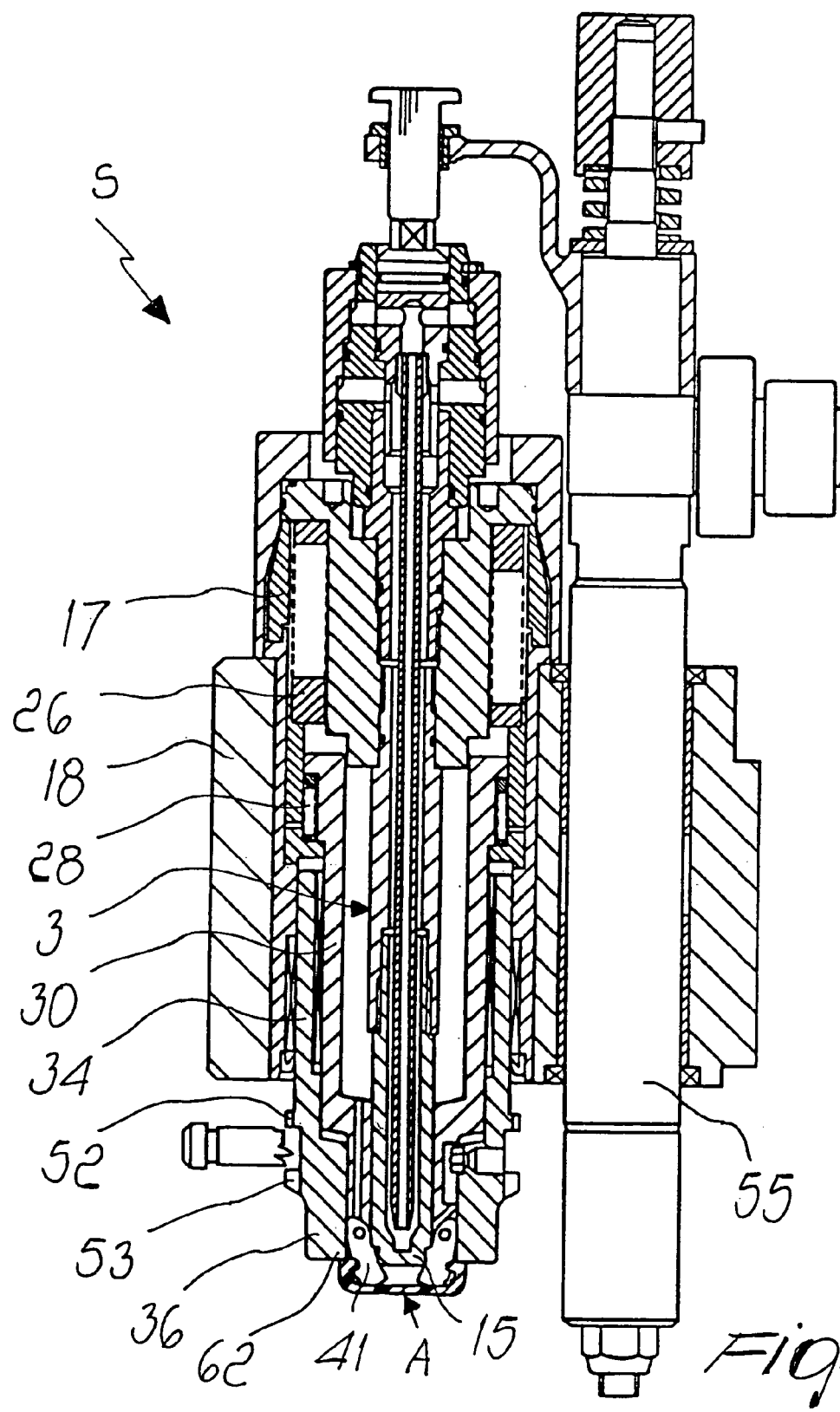
FIG. 4 is a view of the unit in the operating situation in which the cap is extracted.

After the pawls 41 have turned through an angle that is sufficient for the teeth D to disengage from the recesses 45 (the position shown in FIGS. 4 and 5), the thrust applied by the extractor 36 to the closure A allows the closure to slide on the outer surface of the sectors 43, disengaging from the plug, and allows to remove said closure in manners that can vary according to requirements.

As soon as the closure A has abandoned the plug, the actuation cam 60 imparts to the column 55 an upward stroke, which raises the extractor 36 and returns the sleeve 34 into abutment with the lip 27 of the bush 24, while the previously compressed spring 28 lifts the tube 30 again into abutment with the shoulder 31 of the tubular element 6. Due to the relative motion between the tube 30 and the tubular stem 3, the pawls 41 are pushed outward again by the engagement of the plate 15 on the ramps 46, so as to reestablish the final shape of the plug, in which the pawls complete the outer cylindrical wall and the plate 15 closes the opening 40.

The described apparatus is susceptible of numerous modifications and variations, all of which are within the scope of the same inventive concept. For example, it is possible to close the opening 40, giving the stem 3 solely the function of actuating the pawls 41.

Furthermore, by varying the shape of the outer edge of the pawls and their number it is possible to obtain a plug that is capable of molding caps provided with internal undercuts of any shape and angular extension.

Figure 6:
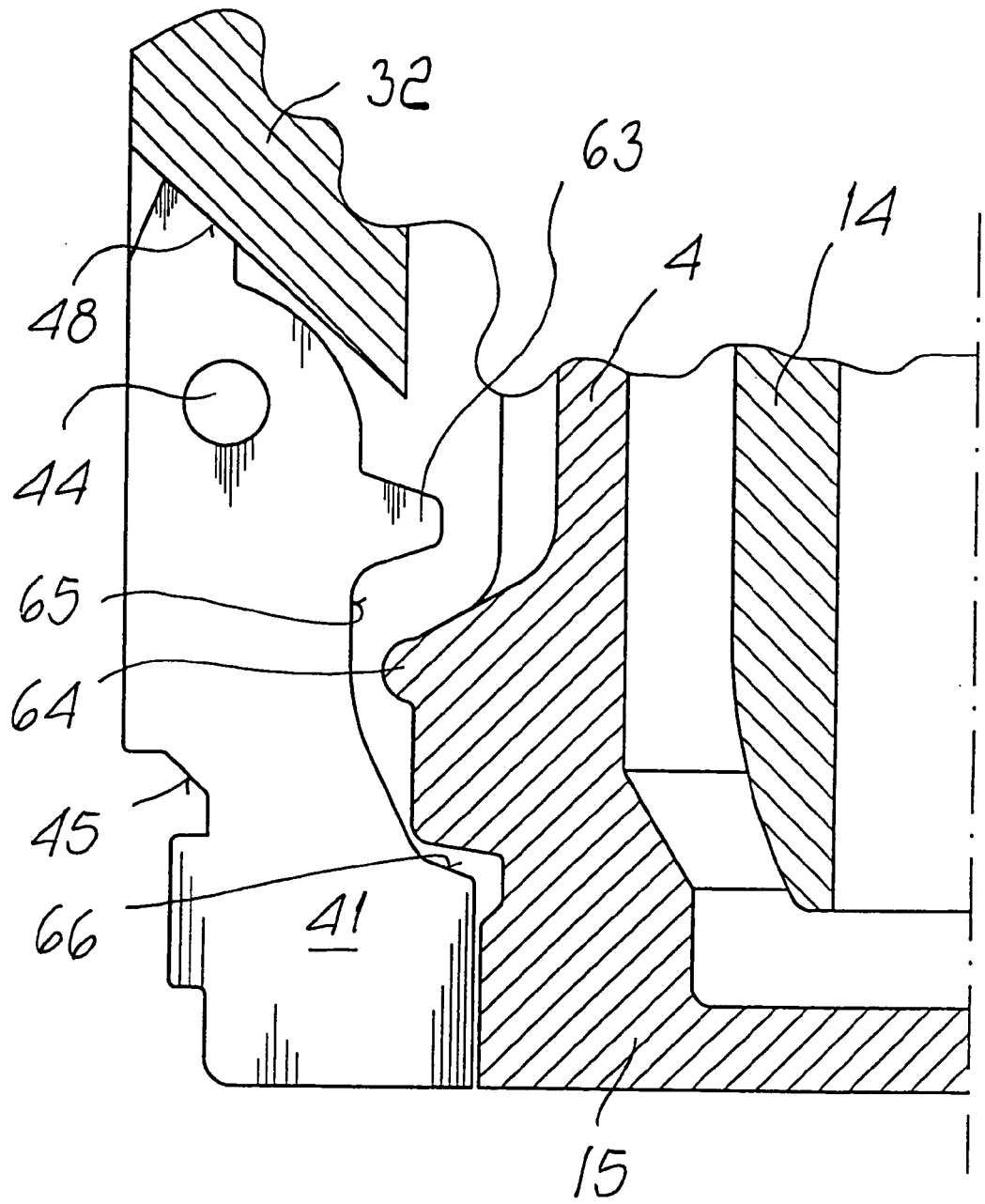
FIG. 6 is a view of a second embodiment of the invention.

FIG. 6 is a view of a second embodiment of the apparatus, in which the pawls 41 are actuated positively by the stem 3 both inward, in order to disengage from the molded closure, and outward, when it is necessary to form the molding chamber.

For this purpose, the pawls 41 have, on their inner edge, a tooth 63, which is suitable to mesh with play with a corresponding complementary tooth 64 formed outside the tubular element 4 proximate to the plate 15. In order to allow the inward oscillation of the pawls, below the tooth 63 there is a hollow 65, which forms a ramp 66 that corresponds to the ramp 46 of the preceding example. Accordingly, when the tube 30 is drawn downward by the extractor 36, the teeth 63 strike the teeth 64, causing the inward rotation of the pawls 41 without the thrust applied by the internal protrusions of the closure contributing to the movement of the pawls. Risk of damage to the closures is thus avoided. The repositioning of the pawls is achieved during the upward movement of the extractor by way of the abutment of the complementary teeth 64 on the ramps 66.

In another variation, the upper mold part 1 and the lower mold part 2 are provided with connections to a source of compressed air which, injected into the mold parts, separates the molded article from the walls of the molding cavity and assists the mechanical expulsive action applied by the ejector 32.

The disclosures in Italian Patent Application No. BO2001A000228 from which this application claims priority are incorporated herein by reference.

The invention claimed is:

1. An apparatus for manufacturing hollow articles made of plastics having internals undercuts, comprising at least one compression-molding unit, which is composed of an upper mold part and of a lower female mold part which is aligned, along a vertical axis, with said mold part, actuation means for actuating said mold parts between a spaced position, at which a dose of plastic material sufficient to mold an article is deposited in the female mold part, and a mutually adjacent position, in order to produce the compression molding of an article, said mold part comprising a tube forming a plug, which can slide in a sleeve that constitutes an extractor associated with said plug in order to remove said molded article when said mold parts are in said space position, a stem which is accommodated coaxially, for axial movement, inside said tube, said tube having an end part provided with angularly distributed seats with respective oscillating elements articulated therein along radial planes, said oscillating elements being provided with an outer face with recesses whose shape is complementary to the shape of said undercuts and with an inner face with ramps which are in functional contact with said stem, whereby said stem is suitable, during the closure of the mold, to move with respect to said tube to actuate said oscillating elements into an external position, in which they form, with said end part of tube, said plug for molding said articles, and, during the opening of the mold parts, to allow said elements to assume an internal position in which said undercuts are disengaged from said recesses in order to allow said extractor to remove said articles from said plug.

2. An apparatus for manufacturing hollow articles made of plastics having internal undercuts, comprising a plurality of compression-molding units arranged on a carousel which rotates about a vertical axis, each one said units comprising: an upper male mold pant and a lower female mold part, which are aligned along an axis which is parallel to said vertical axis of the carousel; actuation means for actuating said male and female mold parts between a spaced position, at which a dose of plastic material sufficient to form an article is deposited into the female mold part, and a contact position, in order to produce the compression molding of said article, said male mold part comprising a tube, which ends with a tubular portion that is shaped so as to form an internal ridge of said article and forms a plug; a sleeve, which constitutes an extractor which can slide on said tube; cam means interacting with said sleeve for actuation thereof between a position in which the sleeve abuts on said female mold part and forms a chamber for molding the articles by compressing said dose of plastic material and a position for removing said articles from said plug; a stem, axially movably accommodated coaxially inside said tube, and wherein said tube has an end part provided with angularly distributed seats and with respective oscillating elements articulated in said seats along radial planes, said oscillating elements being provided with an outer face with recesses whose shape is complementary to a shape of said undercuts and with an inner face with ramps which are in functional contact with said stem, whereby said stem being suitable, during closure of the mold parts, to move with respect to said tube and actuate said oscillating elements into an external position, in which the oscillating elements form, together with said end part of the tube, the molding plug and, during the opening of the mold parts, to allow said oscillating elements to assume an internal position, in which said undercuts are disengaged from said recesses in order to allow said extractor to remove said caps from said plug.

3. The apparatus according to claim 2, wherein said end part of said tube comprises an opening for engaging an end of said stem for the actuation of said oscillating elements.

4. The apparatus according to claim 2, wherein said oscillating elements are constituted by plate shaped pawls articulated in radial notches of said end part which are separated by sectors of said end part, said pawls having an outer edge that is suitable to integrate an outer shape of said sectors in order to form said plug, said pawls being further provided with said recesses which are complementary to said undercuts and with an inner edge which has a portion located at said ramps in functional contact with said stem.

5. The apparatus according to claim 4, wherein said pawls have an abutment for stopping said pawls in said external position in which the pawls integrate the outer shape of said molding plug.

6. The apparatus according to claim 4, further comprising: rods adapted to engage said pawls, said end portion of said tube being provided with axial holes for slidingly accommodating said rods; and elastic means which are adapted to act on said rods in order to actuate said pawls against said actuation stem.

7. The apparatus according to claim 1, wherein the male and female mold parts comprise a connection to a source of compressed air suitable to separate a molded article from walls of the molding chamber.

8. The apparatus according to claim 6, wherein said pawls have an internal tooth and said stem an end plate and a complementary tooth formed proximate to said end plate, said internal tooth being adapted to be engaged by said complementary tooth, said complementary tooth being engaged between said tooth and said portion of the inner edge of the pawls in functional contact with said stem.

9. The apparatus of claim 1, wherein said end part of said tube comprises an opening for engaging an end of said stem for the actuation of said oscillating elements.

10. The apparatus of claim 1, wherein said oscillating elements are constituted by plate shaped pawls articulated in radial notches of said end part which are separated by sectors of said end part, said pawls having an outer edge that is suitable to integrate an outer shape of said sectors in order to form said plug, said pawls being further provided with said recesses which are complementary to said undercuts and with an inner edge which has a portion located at said ramps in functional contact with said stem.

11. The apparatus according to claim 10, wherein said pawls have an abutment for stopping said pawls in said external position in which the pawls integrate the outer shape of said molding plug.

12. The apparatus of claim 10, farther comprising: rods adapted to engage said pawls, said end portion of said tube being provided with axial holes for slidingly accommodating said rods; and elastic means which are adapted to act on said rods in order to actuate said pawls against said actuation stem.

13. The apparatus according to claim 2, wherein the male and female mold parts comprise a connection to a source of compressed air suitable to separate a molded article from walls of the molding chamber.

14. The apparatus according to claim 12, wherein said pawls have an internal tooth and said stem an end plate and a complementary tooth formed proximate to said end plate, said internal tooth being adapted to be engaged by said complementary tooth, said complementary tooth being engaged between said tooth and said portion of the inner edge of the pawls in functional contact with said stem.

15. An apparatus for manufacturing hollow articles made of plastics having internal undercuts, comprising: at least one compression-molding unit, which is composed of an upper male mold part and of a lower female mold part aligned, along a vertical axis, with said male mold part; actuation means for actuating said mold parts between a spaced position, at which a dose of plastic material sufficient to mold an article is deposited in the female mold part, and a mutually adjacent position for compression molding of an article; a tube provided at said male mold pan and having an end part forming a molding plug; a sleeve constituting an extractor, said plug being slidable in said sleeve for removal of a molded article when said mold parts are in said spaced position; a stem which is accommodated coaxially, for axial movement, inside said tube and has a free end; seats that are provided angularly distributed at the end part of said tube; and oscillating elements provided articulated along radial planes within said seats of said tube;

and wherein said oscillating elements comprise outer faces with respective recesses having a shape that is complementary to a shape of said undercuts and inner edges provided with ramps which are in functional contact with said free end of said stem, whereby said stem is adapted to move with respect to said tube and push said oscillating elements, during closure of the mold parts, into an external position in which the oscillating elements form with said end part of the tube the plug for molding said articles, and is further adapted, during opening of the mold parts, to allow said elements to assume an internal position in which said undercuts are disengaged from said recesses in order to allow said extractor to remove said articles from said plug.

16. The apparatus of claim 15, wherein said end part of said tube comprises an opening for engaging an end of said stem for the actuation of said oscillating elements.

17. The apparatus of claim 15, wherein said oscillating elements are constituted by plate shaped pawls articulated in radial notches of said end part which are separated by sectors of said end part, said pawls having an outer edge that is suitable to integrate an outer shape of said sectors in order to form said plug, said pawls being further provided with said recesses which are complementary to said undercuts and with the inner edge which has a portion located at said ramps in functional contact with said free end of said stem.

18. The apparatus according to claim 17, wherein said pawls have an abutment for stopping said pawls in said external position in which the pawls integrate the outer shape of said molding plug.

19. The apparatus of claim 17, further comprising: rods adapted to engage said pawls, said end portion of said tube being provided with axial holes for slidingly accommodating said rods; and elastic means which are adapted to act on said rods in order to actuate said pawls against said actuation stem.

20. The apparatus according to claim 17, wherein said pawls have an internal tooth and said stem an end plate and a complementary tooth formed proximate to said end plate, said internal tooth being adapted to be engaged by said complementary tooth, said complementary tooth being engaged between said tooth and said portion of the inner edge of the pawls in functional contact with said stem.

21. An apparatus for manufacturing hollow articles made of plastics having internal undercuts, comprising: at least one compression-molding unit, which is composed of an upper male mold part and of a lower female mold part aligned, along a vertical axis, with said male mold part; actuation means for actuating said mold parts between a spaced position, at which a dose of plastic material sufficient to mold an article is deposited in the female mold part, and a mutually adjacent position for compression molding of an article; a tube provided at said male mold part and having an end part forming a molding plug; a sleeve constituting an extractor, said plug being slidable in said sleeve for removal of a molded article when said mold parts are in said spaced position; a stem which is accommodated coaxially, for axial movement inside said tube and has a free end; seats that are provided angularly distributed at the end part of said tube; and oscillating elements provided articulated along radial planes within said seats of said tube;

and wherein said oscillating elements comprise outer faces with respective recesses having a shape tat is complementary to a shape of said undercuts and inner edges provided with ramps which are in functional contact with said free end of said stem, whereby said stem is adapted to move -with respect to said tube and push said oscillating elements, during closure of the mold parts, into an external position in which the oscillating elements form with said end part of the tube and with a downward region of said free end of the stem the plug for molding said articles, and is further adapted, during opening of the mold parts, to allow said elements to assume an internal position in which said undercuts are disengaged from said recesses in order to allow said extractor to remove said articles from said plug.

* * * * *

UNITED STATES PATENT AND TRADEMARK OFFICE
CERTIFICATE OF CORRECTION

| | |
|---|---|
| PATENT NO. | : 7,134,866 B2 |
| APPLICATION NO. | : 10/474858 |
| DATED | : November 14, 2006 |
| INVENTOR(S) | : Zeno Zuffa |

It is certified that error appears in the above-identified patent and that said Letters Patent is hereby corrected as shown below:

Title Page

[30] Foreign Application Priority Data should read.

April 18, 2001          [IT] ........................ BO2001A000228

Signed and Sealed this

Sixth Day of February, 2007

JON W. DUDAS
*Director of the United States Patent and Trademark Office*